(12) United States Patent
Ehrlicher

(10) Patent No.: US 6,561,266 B1
(45) Date of Patent: May 13, 2003

(54) HOMOGENIZATION AND HEATING CONTAINER FOR A MIXING HEAD

(75) Inventor: Stefan Ehrlicher, München (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 09/581,638

(22) PCT Filed: Oct. 12, 1999

(86) PCT No.: PCT/EP99/07636

§ 371 (c)(1),
(2), (4) Date: Jun. 13, 2000

(87) PCT Pub. No.: WO00/24556

PCT Pub. Date: May 4, 2000

(30) Foreign Application Priority Data

Oct. 22, 1998 (DE) .......................................... 198 48 780

(51) Int. Cl.⁷ .............................. F28D 7/16; B29B 7/82
(52) U.S. Cl. ...................... 165/161; 165/160; 165/409; 366/148
(58) Field of Search ................................ 366/144, 148, 366/159.1, 162.4, 162.5, 319, 324, 339; 422/133; 165/108, 109.1, 138, 155, 157, 159–161, 409

(56) References Cited

U.S. PATENT DOCUMENTS

| 1,626,487 A | * | 4/1927 | Warren |
| 2,240,841 A | * | 5/1941 | Flynn |
| 2,491,618 A | * | 12/1949 | Luetzelschwab |
| 2,514,894 A | * | 7/1950 | Naab |
| 2,855,449 A | * | 10/1958 | Owen |
| 2,937,079 A | * | 5/1960 | Van Pool |
| 3,048,373 A | * | 8/1962 | Bauer et al. |
| 3,134,432 A | * | 5/1964 | Means |
| 3,390,813 A | | 7/1968 | Alderfer |
| 3,482,625 A | * | 12/1969 | Bray |
| 3,760,870 A | * | 9/1973 | Guetlhuber |
| 3,773,300 A | | 11/1973 | Hauser |
| 3,784,169 A | | 1/1974 | Böckmann et al. |
| 3,915,438 A | * | 10/1975 | Neiley, Jr. et al. |
| 4,074,363 A | * | 2/1978 | Croft |
| 4,307,062 A | | 12/1981 | Wingard |
| 4,430,287 A | | 2/1984 | Tilgner |
| 4,471,836 A | * | 9/1984 | Hokanson |
| 4,589,473 A | * | 5/1986 | Kehrer |
| 4,694,896 A | * | 9/1987 | Navratil |
| 4,919,541 A | * | 4/1990 | Grosz-Roell et al. |
| 5,400,432 A | * | 3/1995 | Kager et al. |
| 5,915,465 A | * | 6/1999 | Fix et al. |
| 6,089,312 A | * | 7/2000 | Biar et al. |

FOREIGN PATENT DOCUMENTS

| DE | 29 08 355 A | 9/1980 |
| EP | 0 025 860 A | 4/1981 |
| GB | 1 074 227 A | 7/1967 |

* cited by examiner

Primary Examiner—Charles E. Cooley
(74) Attorney, Agent, or Firm—Henry M. Feiereisen

(57) ABSTRACT

A container for homogenizing and heating or cooling a liquid working medium is disclosed. The container includes a tubular heat exchanger disposed in the interior space of the container, with the liquid working medium flowing through flow-through tubes of the heat exchanger that are in contact with a heat-exchange medium, A cup-shaped baffle which Is formed of a partition wall and a cover secured to an end of the partition wall proximate to the medium outlet of the flow-through tubes surrounds the heat exchanger and subdivides the interior space of the container between the tubular heat exchanger and the container wall in at least two concentric annular spaces, with each of the concentric annular spaces containing the working medium. The container is suitable for homogenization and heating of polyol components in a polyurethane injection molding apparatus.

6 Claims, 2 Drawing Sheets

HOMOGENIZATION AND HEATING CONTAINER FOR A MIXING HEAD

BACKGROUND OF THE INVENTION

The invention relates to a homogenization and heating container for a liquid working fluid, in particular a liquid component mixed with additives of a plastics injection molding apparatus.

Known containers of this type, as used in conjunction with polyurethane injection molding plants for heating and homogenizing the polyol component, typically mixed with additives such as activators, stabilizers and blowing agents or also milled fibers or powdered minerals, include an outer container casing, which is normally supplied with water as heat carrier, for temperature control, and a compressed gas cushion, provided above the liquid level in the container, for maintaining a defined container pressure and for compensating fluctuations in the filling amount. A high product quality requires an extremely even and exact heating and homogenization of the polyol component, even though the throughput of polyol, in relation to the load capacity of the container, is, in general, very low. Thus, the provision of an agitator is necessary to conduct the polyol fill at high circulating speed along the container casing, which is heated and cooled by the heat carrier, and to implement a thorough mixing. Such an agitator represents, however, a disturbing heat source, has a complicated structure, and increases the energy need, and furthermore risks forced inclusion of gas particles from the gas cushion into the polyol component with resultant foaming thereof.

SUMMARY OF THE INVENTION

It is an object of the invention to provide a homogenization and heating container of the above-stated type, which is simpler in construction and more energy-efficient while yet maintaining a high product quality.

This object is attained in accordance with the invention by the homogenization and heating container which includes a heat exchanger for heating the working medium and a recirculation pump for returning the working medium from the container outlet to the container inlet, wherein the heat exchanger, which is dipped in the working medium inside the container, is arranged at a distance to the container wall and enclosed by at least one partition wall which so subdivides the container in concentric annular spaces that the flow path of the recirculated working medium runs in counterflow direction through the heat exchanger and the annular spaces.

In accordance with the invention, the subdivision of the container volume into several annular spaces, through which recirculated working medium flows sequentially in counterflow direction, in conjunction with the forced inclusion of the inner surfaces as well as the outer surfaces of the heat exchanger into the counterflow path, results not only in a reduction of heat losses of the heat exchanger and effective increase of the heat exchange surfaces, but realizes also high flow velocities inside the container, even at slight container throughputs, and an intimate contact and a thorough mixing of the recirculated working medium with the container content, without requiring a complex and energy-intensive agitator. Thus, the container according to the invention is significantly simplified in construction, exhibits reduced energy consumption and, at the same time, effectively counteracts the risk of foaming of the liquid component in the container.

In the event, a gas or air cushion is generated in the homogenization and heating container above the liquid level, as is typically the case in a polyurethane injection molding apparatus, the partition wall suitably extends with its upper rim beyond the liquid level in the container so that the liquid flow runs in the area of the upper rim of the partition wall along this upper rim to thereby even out the flow distribution during transfer between neighboring annular spaces and to further enhance the degree of mixing.

According to a further, particularly preferred configuration of the invention, the heat exchanger is arranged upstream of the annular spaces in the inlet zone of the container, i.e. at a location where a temperature equalization has not yet occurred between the recirculated working medium and the container content so that the difference of the temperature of the working medium and the desired temperature is the greatest, thereby realizing a high temperature gradient at the heat exchanger and thus an even more efficient use of the heat exchange surfaces.

Preferably, a plate heat exchanger, or a tubular heat exchanger is used as heat exchanger.

Particularly suitable, is the disposition of a plate, at least in the inlet region of one of the annular spaces, for creating a cross sectional constriction, thereby realizing a local acceleration of the flow and deflection of the flow to the center of the annular space. This further significantly enhances the homogenization and heating effect of the container. In particular advantageous is the split of the flow into a plurality of single streams. This can be implemented in a structurally simple manner by configuring the plate as an annular collar which extends transversely to the partition wall and has a plurality of holes, or is provided with a serrated or corrugated flow-by edge.

BRIEF DESCRIPTION OF THE DRAWING

An exemplified embodiment of the invention will now be described in more detail with reference to the drawing, in which.

DETAILED DESCRIPTION OF PREFERRED EMBODIMENTS

Figure 1:
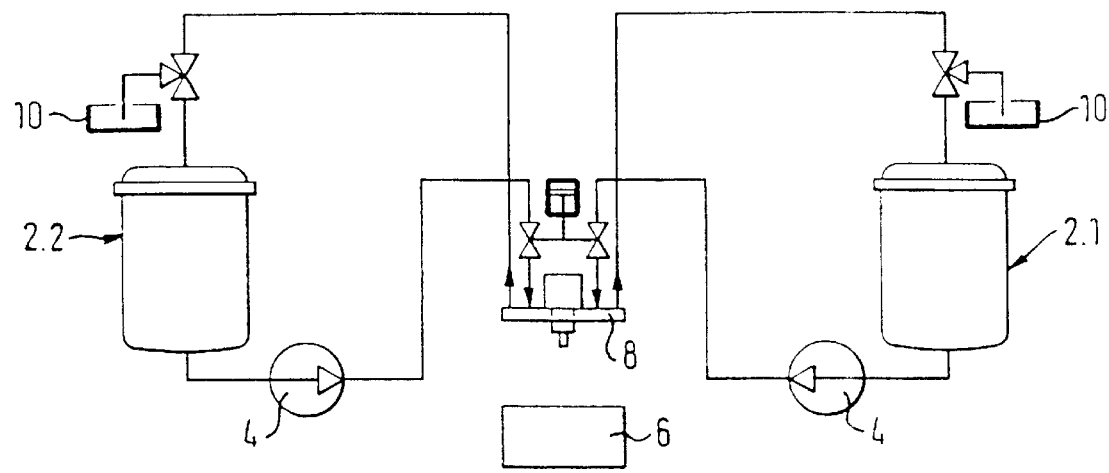
FIG. 1 is a highly schematic principal illustration of a polyurethane injection molding apparatus, including a homogenization and heating container for the polyol component.

The polyurethane injection molding apparatus, shown in FIG. 1, has as main component a polyol container and an isocyante container 2.1 and 2.2, including a recirculation pump 4, by which both plastics components are fed, separated from one another, to a mold station 6 with a mixing head 8 from which component excess, heated during passage through the mixing head 8, flows back together with a refill amount, drawn from a reservoir 10 in correspondence to the component consumption at the mold station 6, into the respective component container 2.1 and 2.2. For reasons of a high product quality, the polyol component, which normally is mixed with additives such as activators, stabilizers, internal blowing agents or also milled fibers or powdered minerals, has to be heated or cooled and homogenized in an extremely even and precise fashion.

The component container 2.1 required for this purpose runs completely free of any agitator and includes in its interior a tubular heat exchanger 14 which is arranged at a distance to the container wall 12 and dips over its entire length into the polyol fill of the container 2.1 which is under pressure by an air cushion 16, whereby the fluid level is controlled via level ports 18. The heat exchanger 14 is disposed immediately downstream of the container inlet 20, so that the respectively circulating polyol amount, which normally constitutes only a slight partial volume of the container capacity, is first heated or cooled by the heat exchanger 14 before contacting the remaining container content.

Figure 2:
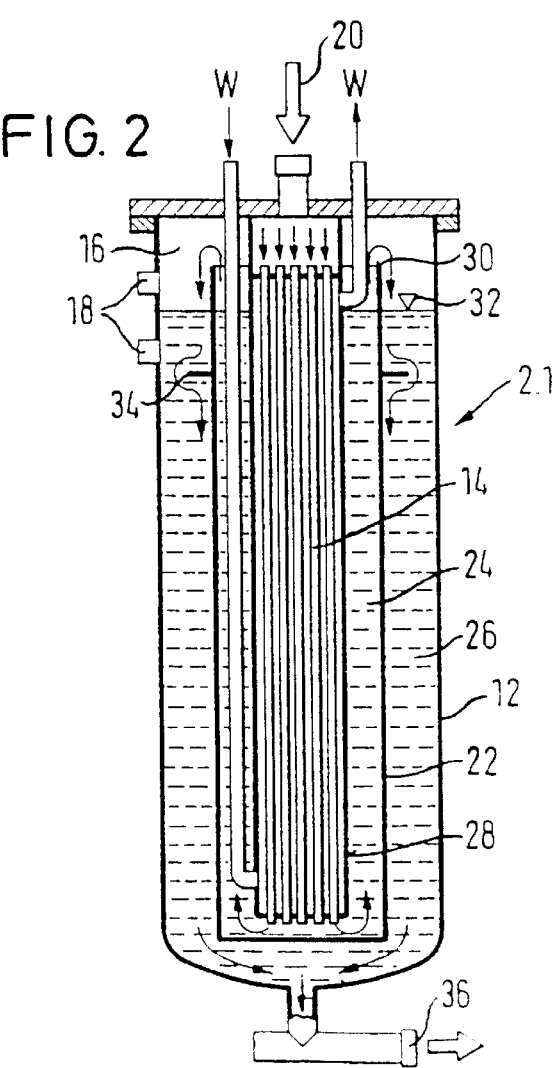
FIG. 2 is a longitudinal section of one embodiment of the polyol container of FIG. 1.

Heated or cooled water is used as heat carrier and, as indicated by the arrows (W) in FIG. 2, flows through the heat exchanger 14 along the outside of the heat exchanger pipes in counterflow direction to the polyol component.

The heat exchanger 14 is enclosed by a partition wall 22 in the form of an inner container which subdivides the container volume between heat exchanger 14 and outer container wall 12 into two coaxial annular spaces 24 and 26. The polyol component, flowing through the heat exchanger pipes, is thus deflected at the lower end of the heat exchanger into the inner annular space 24 and flows upwards therethrough in opposition to the flow direction in the heat exchanger pipes, thereby being further heated or cooled by way of heat exchange with the outer surface 28 of the heat exchanger 14.

In the transition zone to the outer annular space 26, where the flow again is in counterflow direction to the annular space 24, the upper overflow rim 30 of the partition wall 22 extends beyond the liquid level 32 in the annular space 26, so that the flow is evened out at this location and runs along the outside of the partition wall 22 before entering the liquid column in annular space 26.

Positioned slightly below the liquid level 32 in the annular space 26 is a plate 34 which narrows the cross section of the annular space and is configured in the form of an annular collar extending transversely to the partition wall 22 for deflecting the flow within the liquid column toward the center of the annular space, thereby further improving the heating and homogenization action before the polyol amount, required at the mixing head 8, is withdrawn by the recirculation pump 4 through the container outlet 36.

Figure 3A:
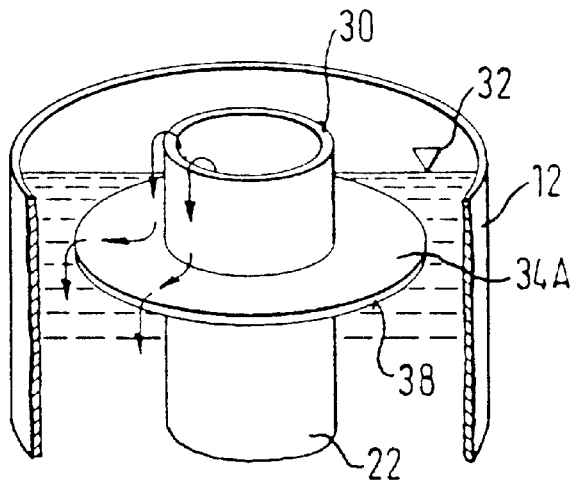
FIGS. 3A to 3C show various exemplified embodiments of flow plates disposed inside the container.
Figure 3B:
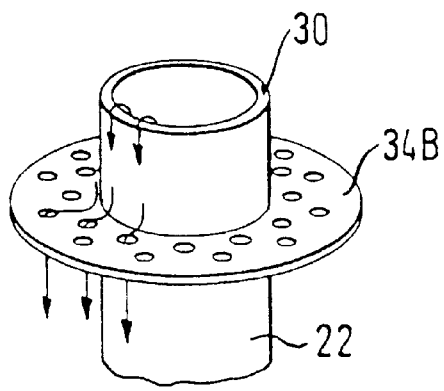
Figure 3C:
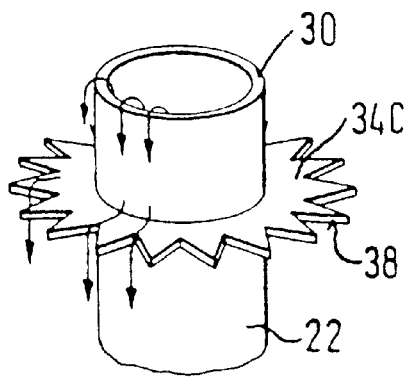

FIG. 3 shows various embodiments of the plate 34. According to FIG. 3A, the plate 34A has a circular flow-by edge 38 which demarcates a constant ring gap in conjunction with the container wall 12. In FIG. 3B, the plate 34 is formed as a ring collar 34B with a plurality of perforations to split the flow in the liquid column locally into a plurality of discrete single strands and to enlarge the interface between the standing and the flowing liquid volume in the liquid column. FIG. 3C shows the plate 34C with a serrated or corrugated flow-by edge 38 for realizing in addition to the interface enlargement a substantially even radial flow partition across the annular space cross section.

What is claimed is:

1. A container for homogenizing and heating or cooling a liquid working medium, comprising:

an outer container body having a bottom, a top and a container wall, with an interior surface of the bottom and the container wall in contact with the liquid working medium, said outer container body further having a container outlet disposed in the bottom and a container inlet disposed in the top;

an inner container having an inner container wall and an inner container bottom, said inner container surrounded by the outer container body and having an opening at a top side facing the container inlet, with both an inner surface and an outer surface of each of the inner container wall and the inner container bottom in contact with the liquid working medium; and a tubular heat exchanger disposed in an interior space of the inner container and comprising a heat exchanger housing and a plurality of flow-through tubes disposed in the heat exchanger housing, each flow-through tube surrounded by a heat-exchange medium and having an inlet receiving the liquid working medium from the container inlet and an outlet facing the container bottom of the inner container and supplying the working medium into the interior space of the inner container, said working medium separated from the heat-exchange medium; and wherein the inner container defines a tortuous path for the working medium, said tortuous path extending through the flow-through tubes of the heat exchanger and successive ones of annular spaces located between the heat exchanger housing and the inner container, and the inner container and the outer container body, respectively.

2. The container according to claim 1, wherein an end section of the inner container wall opposite the-inner container bottom has a rim projecting outside a level of the liquid working medium.

3. The container according to claim 1, and further comprising a flow restrictor arranged in one of the successive ones of annular spaces and secured to the inner container wall.

4. The container according to claim 3, wherein the flow restrictor is configured as a plate.

5. The container according to claim 4, wherein the plate is configured as a ring collar extending transversely from the inner container wall and having a plurality of holes.

6. The container according to claim 4, wherein the plate includes a serrated or corrugated flow-by edge.

* * * * *